United States Patent
Huynh

(10) Patent No.: US 11,055,931 B2
(45) Date of Patent: Jul. 6, 2021

(54) REMOVABLE COMPUTER FOR AIRCRAFT

(71) Applicant: THALES, Courbevoie (FR)

(72) Inventor: Rémi Huynh, Portet sur Garonne (FR)

(73) Assignee: THALES, Courbevoie (FR)

( * ) Notice: Subject to any disclaimer, the term of this patent is extended or adjusted under 35 U.S.C. 154(b) by 196 days.

(21) Appl. No.: 16/363,696

(22) Filed: Mar. 25, 2019

(65) Prior Publication Data

US 2019/0304209 A1    Oct. 3, 2019

(30) Foreign Application Priority Data

Mar. 29, 2018    (FR) ...................................... 1800262

(51) Int. Cl.
| | |
|---|---|
| *G07C 5/00* | (2006.01) |
| *B64D 45/00* | (2006.01) |
| *G06F 21/88* | (2013.01) |
| *G07C 5/08* | (2006.01) |
| *H04W 48/02* | (2009.01) |
| *G09G 5/00* | (2006.01) |

(Continued)

(52) U.S. Cl.
CPC ............ *G07C 5/008* (2013.01); *B64D 43/00* (2013.01); *B64D 45/00* (2013.01); *B64D 45/0015* (2013.01); *B64D 47/00* (2013.01); *G01C 21/00* (2013.01); *G01C 23/00* (2013.01); *G01D 3/10* (2013.01); *G06F 21/88* (2013.01); *G07C 5/0816* (2013.01); *G09G 5/00* (2013.01); *H04W 48/02* (2013.01); *B64D 2045/0065* (2013.01)

(58) Field of Classification Search
CPC ...... G07C 5/008; G07C 5/0816; B64D 45/00; B64D 43/00; B64D 47/00; B64D 45/0015; B64D 2045/0065; G09G 5/00; G09G 2380/12; G01C 23/00; G01C 21/00; G01D 3/10; G06F 21/88; H04W 48/02; G05B 15/02

See application file for complete search history.

(56) References Cited

U.S. PATENT DOCUMENTS

| | | | |
|---|---|---|---|
| 2004/0180653 A1* | 9/2004 | Royalty | H04L 29/06 455/431 |
| 2010/0073197 A1* | 3/2010 | Eagleton | H04Q 9/00 340/945 |

(Continued)

FOREIGN PATENT DOCUMENTS

| | | |
|---|---|---|
| EP | 1 469 652 A1 | 10/2004 |
| EP | 3 208 707 A1 | 8/2017 |

(Continued)

*Primary Examiner* — Marthe Y Marc-Coleman
(74) *Attorney, Agent, or Firm* — BakerHostetler

(57) ABSTRACT

A system for managing the data of an aircraft includes a device of avionics type installed in the aircraft, the installed device being: connectable to an electrical power source of avionics type; connectable to the avionics data bus; comprising a docking support; a removable device of non-avionics type being able to be fixed onto the docking support, the removable device comprising computation and storage resources for the processing of avionics data and, optionally, wireless communication. Developments of the invention describe electrical isolation mechanisms, the facility to cut any wireless communication, in particular cellular, of the removable device, the control and/or the updating of the removable device by ground teams. Method and software aspects are described.

11 Claims, 2 Drawing Sheets

(51) Int. Cl.
*G01C 23/00* (2006.01)
*B64D 43/00* (2006.01)
*G01D 3/10* (2006.01)
*B64D 47/00* (2006.01)
*G01C 21/00* (2006.01)

(56) References Cited

U.S. PATENT DOCUMENTS

| | | | | |
|---|---|---|---|---|
| 2010/0323657 | A1* | 12/2010 | Barnard | H04W 4/029 |
| | | | | 455/404.1 |
| 2014/0222254 | A1 | 8/2014 | Ribich | |
| 2015/0120097 | A1* | 4/2015 | Hathaway | H04L 67/12 |
| | | | | 701/14 |
| 2016/0124738 | A1* | 5/2016 | Haukom | H04L 67/34 |
| | | | | 717/170 |

FOREIGN PATENT DOCUMENTS

| | | |
|---|---|---|
| FR | 2 907 758 A1 | 5/2008 |
| FR | 3 005 162 A1 | 10/2014 |

\* cited by examiner

REMOVABLE COMPUTER FOR AIRCRAFT

CROSS-REFERENCE TO RELATED APPLICATIONS

This application claims priority to foreign French patent application No. FR 1800262, filed on Mar. 29, 2018, the disclosure of which is incorporated by reference in its entirety.

FIELD OF THE INVENTION

The invention relates to the technical field of avionics and of air operations in general. In particular, examples of methods and systems are described, for the management, the acquisition, the distribution and the synchronization of data relating to an aircraft.

BACKGROUND

The data manipulated in the avionics systems are generally of several types. They can be flight data (records of flight parameters of the aircraft or data resulting from the computation of systems allowing the piloting of the aircraft like the inertial units or flight management). The data can also comprise maintenance data (for example system alerts or failures, avionics software remotely distributed to the aeroplane). Finally, the data can comprise operational flight data (flight dossier, operational status, quantity of fuel, etc.).

The solutions that exist in the state of the art rely on equipment embedded and certified by the air regulator. These devices involve complex developments (quality assurance) and lengthy and expensive deployment. These known approaches are slow and difficult to improve or update.

SUMMARY OF THE INVENTION

The present invention relates to a system for managing the flight of an aircraft comprising: a device of avionics type installed in the aircraft, said installed device being: connectable to an electrical power source of avionics type; —connectable to the avionics data buses; —comprising a docking support; —a removable device of non-avionics type being able to be fixed to the docking support, said removable device comprising computation, storage and wireless data transmission resources for the processing of avionics data. Developments of the invention describe electrical isolation mechanisms, the facility to cut any wireless communication, in particular cellular, from the removable device, the control of the removable device by ground teams. Method and software aspects are described. The system according to the invention can communicate with devices of avionics type comprising flight data concentration systems (FDAU), inertial units (IRS), maintenance computers (CMS) or flight management computers (FMS).

Advantageously, in an embodiment of the invention, the docking device is an interface with the avionics systems and the removable device.

Advantageously, the invention combines:
electrical isolation (to avoid, for example, any overvoltage injected from the removable device to the avionics systems), and/or
unidirectional communication from the avionics systems to the removable device (to prevent any injection of accidental or malicious data into the certified systems) and/or
automatic cutting of cellular communications (for example 3G, 4G or 5G, etc.) in order to reduce or prevent electromagnetic disturbances.

Other advantages will emerge from the following description.

BRIEF DESCRIPTION OF THE DRAWINGS

Other features and advantages of the invention will become apparent from the following description and the figures of the attached drawings in which.

DETAILED DESCRIPTION

Figure 1:
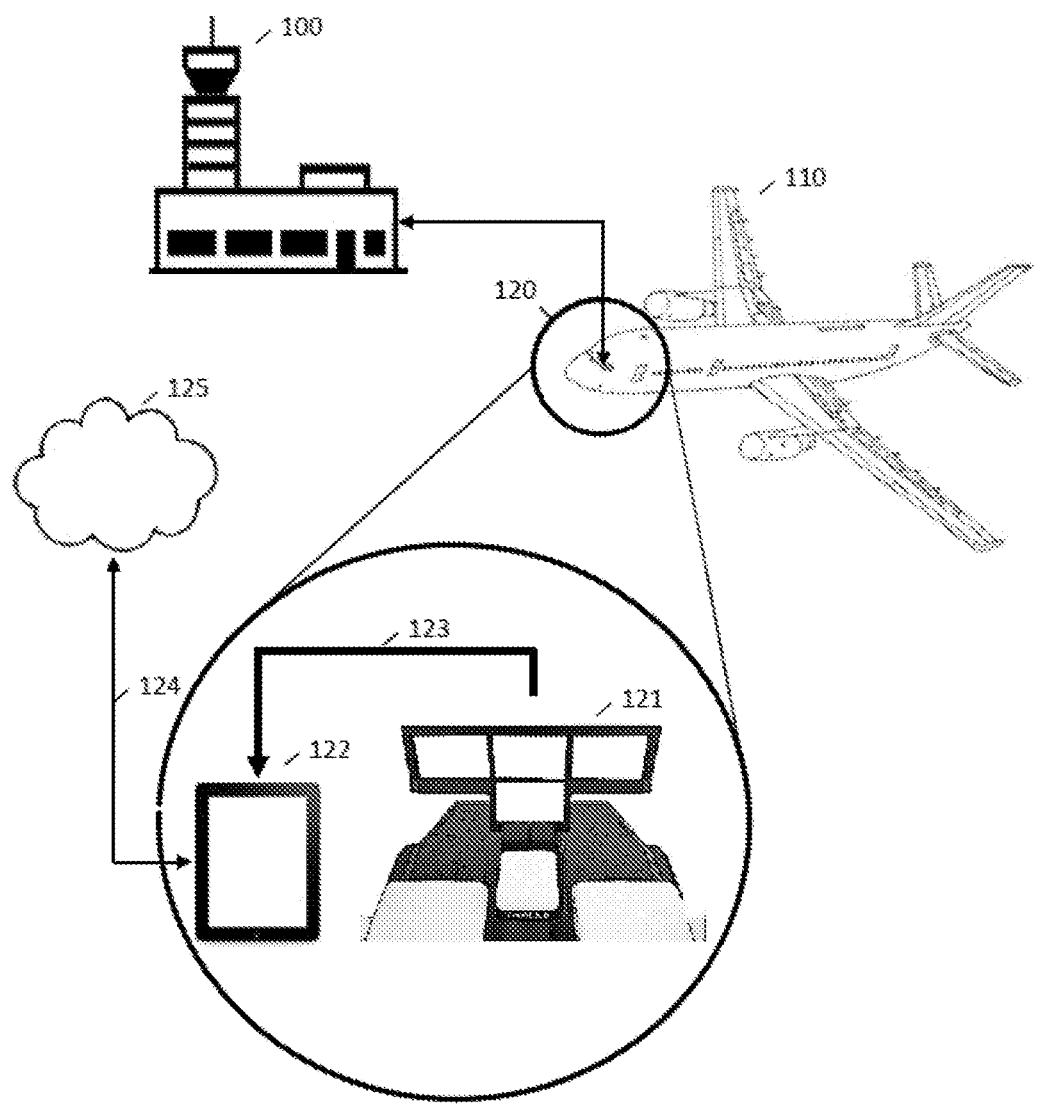
FIG. 1 illustrates the general environment of the invention.

FIG. 1 illustrates the global technical environment of the invention.

The figure shows examples of systems (or "equipment" or "instruments" or "hardware" or "devices" or "means") of "non-avionics" or "open world" type and equipment of "avionics" type (certified by the regulator).

An aircraft is a transport means capable of moving around in the Earth's atmosphere. For example, an aircraft can be an aeroplane or a helicopter (or even a drone). The aircraft comprises a cockpit and avionics holds 120. The latter contain piloting avionics equipment 121 (certified by the air regulator in a certificate of so-called "TC" type), optional avionics equipment (certified by the air regulator in a certificate of supplementary type called "STC") and non-avionics optional equipment (whose use is approved by the air regulator in an operational approval called "Ops Approval").

An "avionics system" (or "system of avionics type") is a system having specific technical characteristics compared to a "non-avionics" system (or "system of non-avionics type" or "open world"), these technical characteristics being certified administratively by a trusted authority (in this particular case, the air regulator).

Regarding the distinctive technical characteristics of an avionics system, a system—generally i.e. avionics or non-avionics—can exhibit or be associated with a predefined failure rate (out of a predefined range of failure rates), a failure rate comprising or determining a predefined execution error rate.

In one embodiment, the failure rate of a system of avionics type is lower than the failure rate of a system of non-avionics type. In one embodiment, the failure rate of an avionics system is significantly or substantially lower than that of a non-avionics system.

An avionics system denotes a reliabilized system (or system with guaranteed reliability). It is a system whose failure has consequences that exceed accepted or acceptable limits, and are therefore feared. A failure can be characterized by the loss of the function concerned, or by the production of erroneous data, with or without detection of an error. Depending on the level of criticality of the feared consequences, the probability of occurrence must be kept below an acceptability threshold. Thus, the more critical the consequence, the lower the acceptable probability of occurrence. For example, in aeronautics, a catastrophic event (multiple deaths) will have to have a probability of occurrence lower than $10^{-9}$ per hour of flight, whereas a major incident (reduction of the safety margins and of operational capabilities, discomfort or slight injuries) will have to have a probability of occurrence lower than $10^{-5}$ per hour of flight. To ensure these objectives, the architecture of the avionics system (reliabilized) and the design of each component guarantee this probability of occurrence through guarantees of failure rate of each item of equipment (physical failures) and levels of verification (functional and structural test coverage) of the software.

These requirements demand a significant design and verification effort, and impose a limitation in the complexity of the processes implemented.

Conversely, the failure of a non-reliabilized system, or system with non-guaranteed reliability (non-avionics system) has consequences that are deemed tolerable, non-critical, or even without significant operational impact. The requirements on the architecture, the physical components or the software processes are therefore lesser, and allow more complex processes, and a lesser development and verification effort compared to a reliabilized system.

Generally, an avionics system is associated with a lower physical failure rate and a higher logic verification than those of a system of non-avionics type.

Some technical terms and environments are defined hereinbelow.

The acronym or symbol EFB corresponds to the term "Electronic Flight Bag" and denotes embedded electronic book stores. Generally called "electronic flight bag" or "electronic flight bag/satchel" or "electronic flight tablet", an EFB is an electronic device that is portable and is used by navigating personnel.

The acronym HMI corresponds to the human-machine interface. The input of the information, and the display of the information input or computed by the display means, constitute such a human-machine interface. Generally, the HMI means allow for the input and the consultation of flight plan information, piloting data, etc.

FIG. 1 illustrates the global technical environment of the invention. Means on the ground (control centres and design offices) 100 are in communication with an aircraft 110. An aircraft is a transport means capable of moving around in the Earth's atmosphere. For example, an aircraft can be an aeroplane or a helicopter (or even a drone). The aircraft comprises a piloting cabin or a cockpit 120. In the cockpit, there are piloting equipment items 121 (called avionics equipment), comprising, for example, one or more onboard computers (means for computing, memorizing and storing data), including in particular, but not only, one or more piloting avionics systems, means for displaying or visualizing and inputting data, communication means, and (possibly) haptic feedback means. A device according to the invention can be located on board, "removably" or "portably" ("attached to the aeroplane"). By contrast, an EFB tablet can be either "pilot attached" or "A/C attached". The device according to the invention can interact (unilateral communication 123) with the avionics equipment ("TC" category) 121. The unidirectional communication reflects that the avionics equipment is safeguarded or cut off or separated from any interference with the systems of non-avionics type 122 (by different means or methods described hereinbelow). The device according to the invention can also be in communication 124 with external computing resources, accessible via the network (for example by Cloud computing 125). In particular, the computations can be performed locally on the device 122 or partially or totally in the computation means that can be accessed via the network. The onboard equipment 121 is generally certified (TC or STC categories) and regulated whereas the device 122 and the connected computing means 125 are generally not (or to a lesser extent, for example by "operational approval"). This architecture makes it possible to inject flexibility on the side of the device 122 by ensuring controlled security on the side of the embedded avionics 121.

Figure 2:
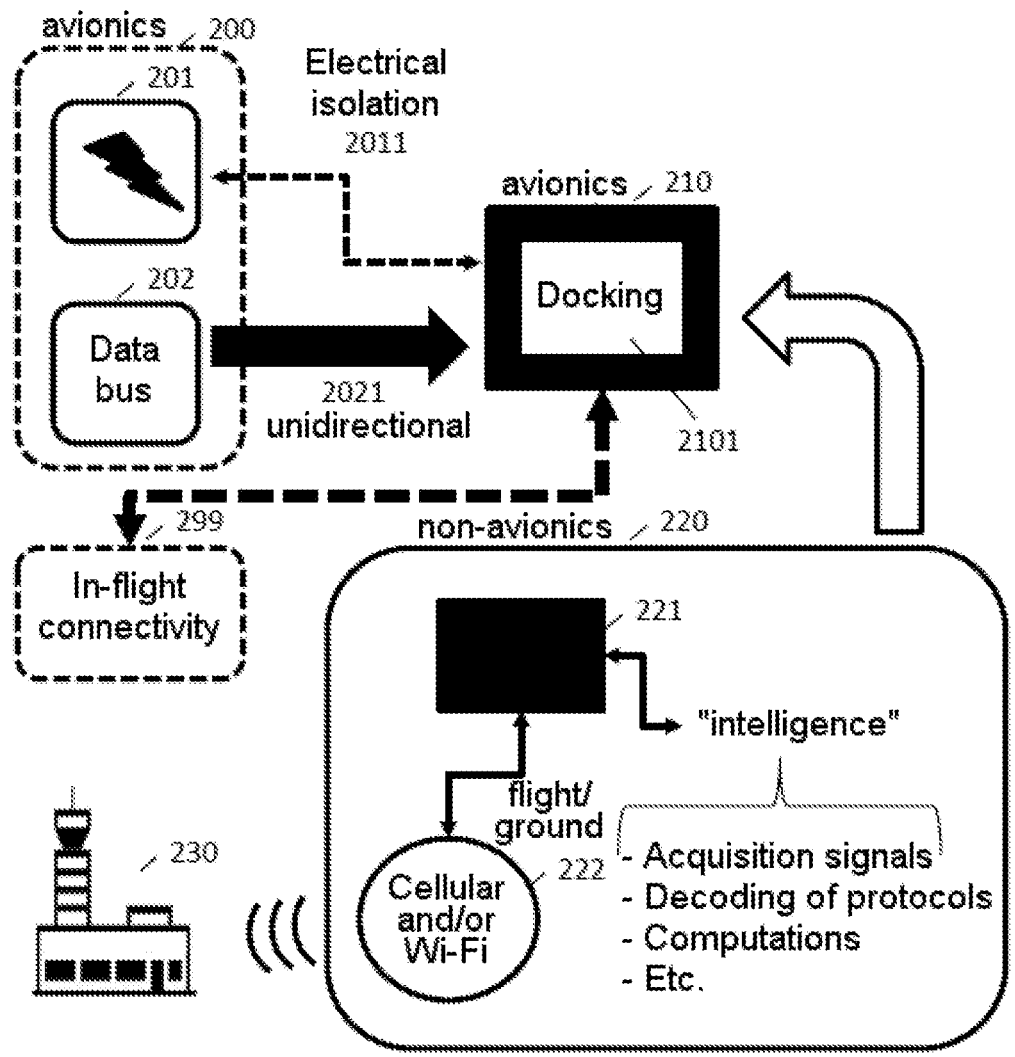
FIG. 2 illustrates an exemplary embodiment according to the invention.

FIG. 2 illustrates an exemplary embodiment according to the invention.

It describes a piloting avionics system of an aircraft comprising: devices of avionics type comprising flight data concentration systems (FDAU), inertial unit systems (IRS), maintenance computer systems (CMS) or flight management systems (FMS); a device of avionics type 210 installed in the aircraft (STC category), said installed device being "connectable" (or "being able to be connected" or being "capable of being connected" or being "configured to be able to be connected") to an electrical power source 201 of avionics type; being "connectable" or being able to be connected (being "capable of being connected" or being "configured to be able to be connected") to the avionics data buses 202; comprising a docking support 2101; —a removable device (220) of non-avionics type being able to be fixed onto the docking support 2101, said removable device (220) comprising computation and storage resources 221 for processing avionics data.

The device 210 comprises a docking station including electrical isolation and electrical voltage conversion capabilities but does not have dedicated computation capabilities. This first part is the certified or regulated part. In one embodiment, the docking station can comprise a power splitter so as to obtain a power line for the removable device. A first power line can be provided permanently when the removable device is inserted into the docking station. The second power line can be connected or disconnected when the aircraft is in flight (so as to suspend or cut cellular communication with the removable device to avoid any electromagnetic interference with the embedded certified avionics computers). Furthermore, the docking station can comprise a data interface between the avionics and the removable device.

The "in-flight connectivity" block 290 (STC category) illustrates the bidirectional communication with the device 210. This block 299 corresponds in particular to the in-flight communication modems (SATCOM for satellite link or ATG for link based on Air-To-Ground technology).

The removable device (220) can decode the recordings of the flight recorders and/or of the avionics data to broadcast parameters a) to the electronic devices used by the pilots (for example the electronic flight bags or EFBs) and/or b) to the members of the maintenance crews and/or c) to the ground operations (e.g. baggage, back office, etc.).

The device (220) is "removable". It is "detachable", particularly without tool(s): it can be attached or detached manually (i.e. with one or two hands) to or from the aeroplane or to or from a part of the cockpit.

In an optional embodiment, the removable device can be locked and unlocked (stronger physical association). In one embodiment, the locking and/or unlocking are free, i.e. can be performed manually, without authorization. In one embodiment, the removable device and the docking station are coupled to an anti-theft system (protection by key, by code, by pin, by fingerprint, by iris scan, or by any other biometric means) making it possible to safeguard against the theft of the removable system (while securing the attachment to the aeroplane).

The device comprises in particular signal acquisition and protocol decoding circuits. The device (220) is not certified, it forms part of the "open world" (requires only an "operational approval"). Physically, the removable device can be of different kinds (proprietary circuit, market-standard computer, e.g. portable, portable telephone, tablet, etc.). The device can comprise (or not) display or HMI means (e.g. screens, projector, pins, loudspeaker, input interface, voice or gesture control, etc.). The removable device can optionally access "elastic" computation resources (computation in the clouds) and can in particular interact with equipment on the ground, for different services. For example, it can communicate (push and/or pull modes) flight data to equipment located on the ground. For example, a 4G router can transfer flight data autonomously and constitute a secure access point for authorized ground equipment. In one embodiment, the graphical display of a code (for example a QR code) can make it possible to communicate a password in order to authenticate one or more decisions and/or for signature purposes. In one embodiment, the software component can stream or communicate data continuously (for example flight data) to devices on the ground, so as to allow for "live" displays (live broadcast).

The removable device can be perceived as the "brain" or the management entity which is "grafted" onto the avionics, without disturbing it or risking corrupting it. Generally, the removable device is open-ended. Its certification is called "ops approved" (operational approval, i.e. on account of the air line, the component suppliers having to provide demonstration elements for this specific certification).

In a development, the device 221 is electrically isolated from the devices of avionics type through the device 210. For example, the device of avionics type 210 comprises an optocoupler. This type of isolation avoids or prevents in particular any overvoltage in the certified avionics circuits.

In a development, the removable device (220) of non-avionics type further comprises a wireless communication circuit 222, for example cellular (2G, 3G, 4G, 5G, etc.) and/or Wi-Fi/Bluetooth or the like. A cellular link allows communications to the ground. A communication by Wi-Fi allows in particular exchanges with EFB tablets.

In a development, the device of avionics type 210 is configured to determine the in-flight or on-the-ground status of the aircraft, and in response to this determined status, to stop or suspend or cut any wireless communication, in particular of cellular type. Advantageously, this approach prevents any electromagnetic disturbance. The statuses can be graded (e.g. taxiing, take-off, landing gear activated, deployed, in progress, etc.) and the consequences can also be modulated.

In a development, the system according to the invention further comprises a device 230 situated on the ground allowing for the exchanges of data and the operational administration of the device (220)

In a development, the docking support is associated with one or more temporary physical association mechanisms, of mechanical and/or electrical and/or magnetic and/or chemical kind.

A method is described for managing the flight of an aircraft comprising the steps of:
  connecting a removable device (220) of non-avionics type to a docking support 2101 installed in the aircraft and of avionics type, said docking support being initially in a configuration of electrical isolation with devices of avionics type 200;
  after connection of the removable device (220) to the docking support, electrically connecting said docking support to an electrical power supply forming part of the devices of avionics type 200; and
  unilaterally receiving avionics data in the removable device (220) from the devices of avionics type 200.

In a development, the method further comprises the steps of: determining the in-flight or on-the-ground status of an aircraft, or according to different intermediate states;
  if appropriate, based on the determined status, stop any wireless communication from the removable device (220).

A computer program product is described, said computer program comprising code instructions making it possible to perform one or more of the steps of the method, when said program is run on a computer.

The present invention can be implemented from hardware and/or software elements. It can be available as computer program product on a computer-readable medium. The medium can be electronic, magnetic, optical or electromagnetic.

The invention claimed is:

1. A system for managing the flight of an aircraft comprising:
  a device of avionics type installed in the aircraft, said device of avionics type being:
    connectable to an electrical power source of avionics type,
    connectable to an unidirectional avionics data bus;
    connectable to an in-flight connectivity system;
    comprising a docking support;
  a removable device of non-avionics type being able to be fixed onto the docking support, said removable device comprising computation and storage resources to process avionics data received from the device of avionics type, said removable device being configured to transmit parameters associated the avionics data to electronic devices used by pilots, maintenance crew members and/or ground operations members.

2. The system according to claim 1, the removable device being electrically isolated from devices of avionics type of the aircraft through said device of avionics type.

3. The system according to claim 1, the removable device of non-avionics type comprising a wireless communication circuit, for example cellular.

4. The system according to claim 3, the device of avionics type being configured to determine the in-flight or on-the-ground status of the aircraft, and in response to this status, to stop any wireless communication, in particular of cellular type.

5. The system according to claim 1, further comprising a device situated on the ground allowing exchanges of data and the operational administration of the removable device and/or remote updating of the removable device.

6. The system according to claim 1, wherein the docking support is associated with one or more temporary physical association mechanisms, of mechanical and/or electrical and/or magnetic and/or chemical nature.

7. The system according to claim 1, wherein the removable device can also process data of non-avionics type.

8. The system according to claim 1, the removable device and the docking station being coupled to or by a locking and/or unlocking mechanism that can comprise an anti-theft system.

9. A method for managing the flight of an aircraft comprising the steps of:
  connecting a removable device of non-avionics type to a docking support of a device of avionics type installed in the aircraft, said docking support being initially in a configuration of electrical isolation with the device of avionics type;

after connection of the removable device to the docking support, electrically connecting said docking support to an electrical power supply forming part of the device of avionics type; and unilaterally receiving avionics data in the removable device from the device of avionics type, processing avionics data and transmitting parameters associated to the avionics data to electronic devices used by pilots, maintenance crews members and/or ground operations members.

10. The method according to claim 9, further comprising the steps of:

determining the in-flight or on-the-ground status of an aircraft, or according to different intermediate states;

if appropriate, depending on the determined status, stop all wireless communication from the removable device.

11. A computer program product stored in a non-transitory computer readable medium, said computer program comprising code instructions making it possible to perform the steps of the method according to claim 9, when said program is run on a computer.

\* \* \* \* \*